United States Patent
Takagi et al.

(10) Patent No.: US 6,679,798 B1
(45) Date of Patent: Jan. 20, 2004

(54) METAL BELT ELEMENT, METAL BELT, AND METHOD OF ASSEMBLING THE METAL BELT

(75) Inventors: Shigemasa Takagi, Hashima (JP); Yutaka Takagi, Hashima (JP)

(73) Assignee: Fukuju Kogyo Kabushiki Kaisha (JP)

( * ) Notice: Subject to any disclaimer, the term of this patent is extended or adjusted under 35 U.S.C. 154(b) by 0 days.

(21) Appl. No.: 09/831,245

(22) PCT Filed: Nov. 4, 1999

(86) PCT No.: PCT/JP99/06132

§ 371 (c)(1),
(2), (4) Date: May 4, 2001

(87) PCT Pub. No.: WO00/28237

PCT Pub. Date: May 18, 2000

(30) Foreign Application Priority Data

| Nov. 5, 1998 | (JP) | 10/315156 |
| Dec. 28, 1998 | (JP) | 10/373907 |
| May 21, 1999 | (JP) | 11/141182 |
| Jun. 7, 1999 | (JP) | 11/158892 |
| Oct. 28, 1999 | (JP) | 11/306964 |

(51) Int. Cl.⁷ ............................. F16G 1/18; F16G 1/20
(52) U.S. Cl. ..................... 474/242; 474/201; 474/240
(58) Field of Search .................. 474/242, 201, 474/237, 240, 244, 245, 265, 272; 29/892, 569, 896.3

(56) References Cited

U.S. PATENT DOCUMENTS

| 2,475,264 A | * | 7/1949 | Sutton | 474/245 |
| 3,645,123 A | * | 2/1972 | Auge | 29/896.3 |
| 4,193,312 A | * | 3/1980 | Cicognani | 198/867.13 |
| 4,303,403 A | | 12/1981 | Lamers | |
| 4,342,561 A | * | 8/1982 | Braybrook | 474/242 |
| 4,386,921 A | * | 6/1983 | Roberts | 474/201 |
| 4,422,231 A | * | 12/1983 | Braybrook | 29/509 |
| 4,581,002 A | * | 4/1986 | Cataldo | 474/201 |

FOREIGN PATENT DOCUMENTS

| EP | 0216996 | 4/1987 |
| JP | 55-100443 | 7/1980 |
| JP | 57-190946 | 12/1982 |
| JP | 59-54838 | 3/1984 |
| JP | 59-131052 | 7/1984 |
| JP | 62-35136 | 2/1987 |
| JP | 62-140246 | 9/1987 |
| JP | 3-72139 | 7/1991 |
| JP | 4-31354 | 3/1992 |
| JP | 5-3693 | 1/1993 |
| JP | 5-86054 | 11/1993 |

* cited by examiner

*Primary Examiner*—Marcus Charles
(74) *Attorney, Agent, or Firm*—TraskBritt

(57) ABSTRACT

A metal belt, comprising a metal band (18) passed around a drive pulley (12) and a driven pulley (15) and a plurality of elements (19) disposed laminatedly in the extending direction of the band; each element being formed of wire material and further comprising a body part (31) in contact with the pulley, vertically installed parts (32) erected from both sides of the body part, and a pair of hook parts (33) which extended from the vertically installed parts and disposed opposedly to each other, wherein an opening part (34) is formed with the body part and both hook parts and, because the band (18) is inserted into the opening part (34) of each element so as to prevent the element from falling down from the band, a falling prevention body (20) is disposed in the opening part overlappingly with the band (18).

11 Claims, 12 Drawing Sheets

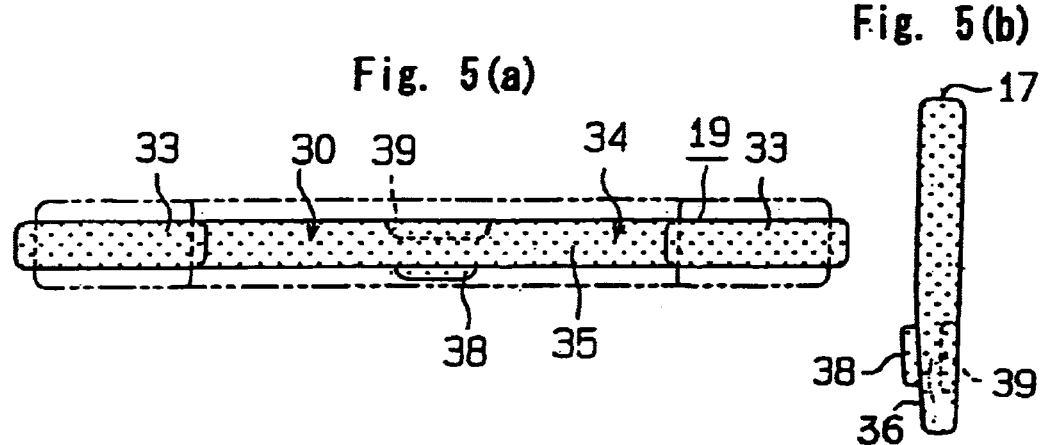
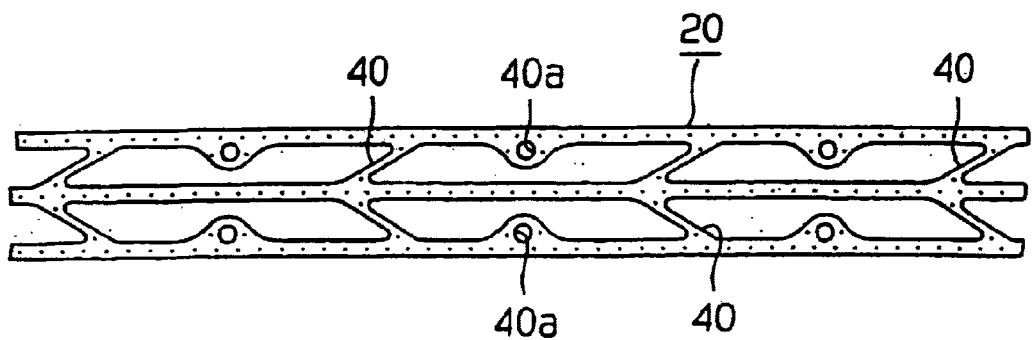

(Prior Art)

METAL BELT ELEMENT, METAL BELT, AND METHOD OF ASSEMBLING THE METAL BELT

BACKGROUND OF THE INVENTION

The present invention relates to an endless metallic belt to be extended between a drive pulley and a driven pulley. The present invention also relates to an element constituting the metallic belt and a process of assembling the same.

There is known a metallic belt used, for example, in an automotive stepless variable speed device, in which a multiplicity of slat-like elements formed by punching a metal plate are layered to be slidable relative to the longitudinal direction of the belt. In this metallic belt, if the elements have corners, the corners of the elements can damage the band when they are brought into contact with it, being causative of breakage of the band.

However, since conventional metallic belt elements are very small and are formed by punching a plate material, it is impossible to subject the elements at the corners to chamfering or other treatments.

Also, since each element is made of a single plate material, the weight of the element cannot be reduced. These elements are circulated along a circular orbit over pulleys of a stepless variable speed device. However, if the element has a great mass, a great centrifugal force acts upon it accordingly. In addition, a great inertia force acts upon the element when a vehicle is accelerated or decelerated. Such excessive centrifugal force and inertia force reduce responsiveness and hinder smooth performance of the stepless variable speed device. Heavy elements cause these problems.

Further, since each element is made of a single plate, it hardly deforms when an execessive load or force acts upon the element when contact with pulleys occurs. Thus an element cannot release the load or force, which causes damage or abnormal abrasion of the elements and pulleys.

The present invention was accomplished in view of the problems inherent in the prior art technique as described above. The object of the present invention is to provide a metallic belt element that can prevent damage and abnormal abrasion in such elements, bands and pulleys and that can operate smoothly in power transmission, a metallic belt and a process of assembling the metallic belt.

BRIEF SUMMARY OF THE INVENTION

In order to attain the above object, in metallic belt element according to a first embodiment of the present invention, the metallic belt elements are supported by an endless metallic band extended between a drive pulley and a driven pulley and are layered in the longitudinal direction of the band. The periphery of the element is made of wire.

In a second embodiment of the present invention includes: a metallic belt having an endless metallic band extending between a drive pulley and a driven pulley; and a multiplicity of elements layered in the longitudinal direction of the band. In the metallic belt, the periphery of the element is formed of wire. The element includes a body, which contacts the pulleys, pillars, which rise from each side of the body, respectively, and a pair of hooked portions, which extends inward from the pillars and oppose each other. The body and the hooked portions define an opening. A stopper is arranged on the band within the opening to prevent the elements from slipping off the band placed in the opening.

The third embodiment of the present invention is a suitable process of assembling a metallic belt. According to this process, an endless belt-like stopper is located on the band. Next, the band is placed in an opening of each metallic belt element with the stopper being flexed laterally. Subsequently, the stopper is returned to a normal planar state to allow it to engage with inner side edges on both sides of the opening of each element, thus attaching the elements to the band.

BRIEF DESCRIPTION OF THE DRAWINGS

FIG. 5(a) is a plan view of the element;

FIG. 5(b) is a side view of the element;

FIG. 6 is a cross-sectional view of the wire;

FIG. 7 is a plan view of the stopper;

DETAILED DESCRIPTION OF THE PREFERRED EMBODIMENTS

Figure 1:
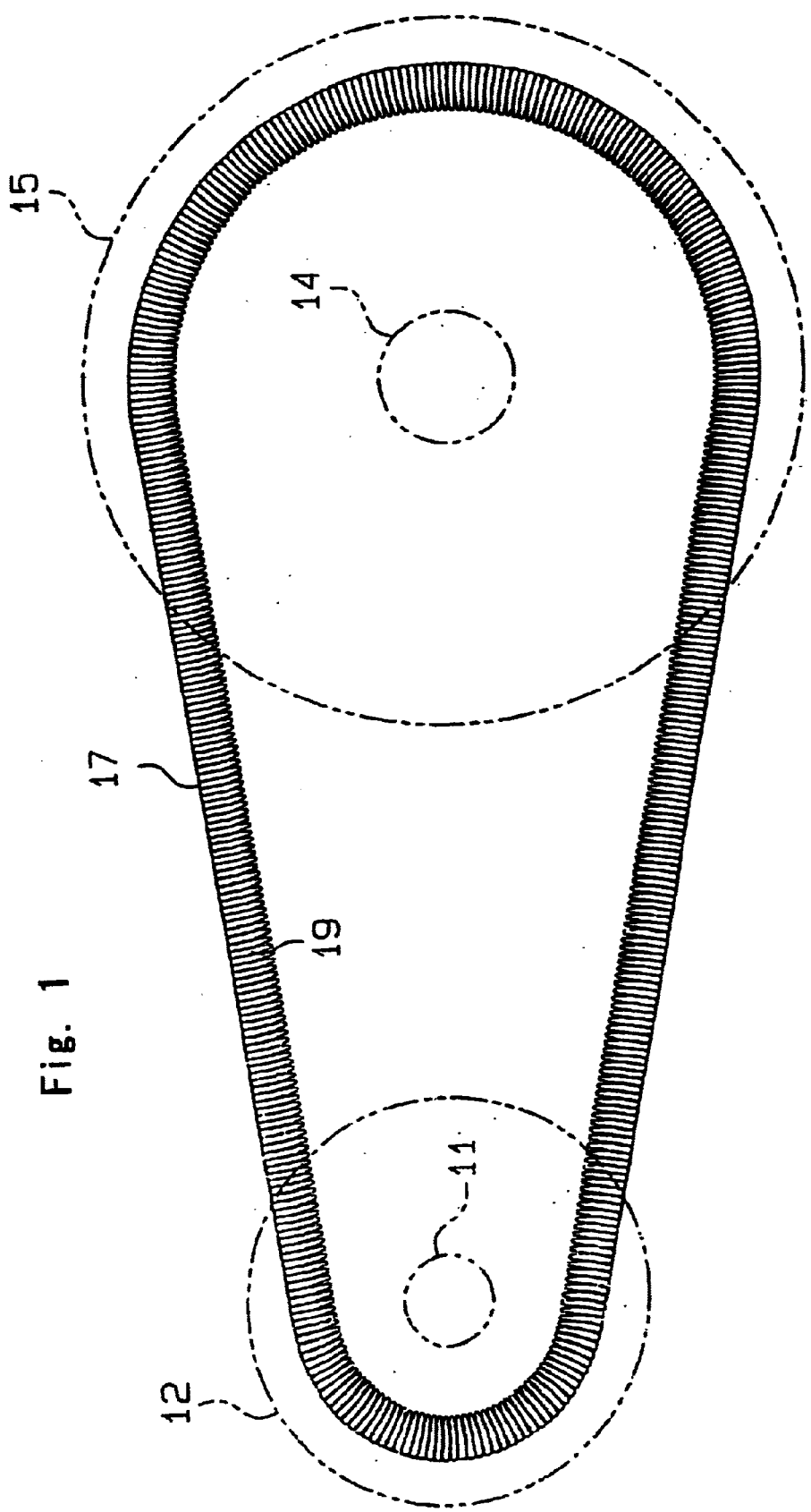
FIG. 1 is a side view showing the metallic belt according to a first embodiment of the present invention.

The present invention will be described below specifically by way of embodiments realized in an automotive stepless variable speed device referring to the drawings.

First Embodiments

A first embodiment will be described in detail referring to FIGS. 1 to 12. In the first embodiments, the expressions "upper" and "lower", and "right" and "left" are referred to based on the drawing shown in FIGS. 2 or 4. The expressions "ahead" and "behind" are also referred to based on FIGS. 2 or 4.

Figure 3:
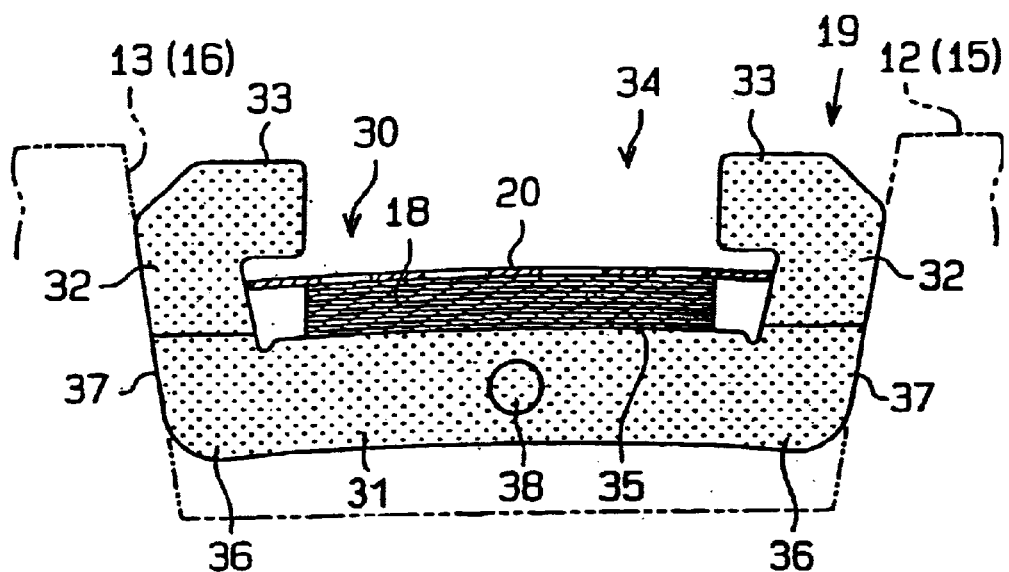
FIG. 3 is a vertical cross-sectional view of the metallic belt.

As shown in FIG. 1, a drive pulley 12 is attached to a drive shaft 11. A substantially V-shaped annular groove 13 is formed in the periphery of the pulley 12, as shown in FIG. 3. A driven pulley 15 is attached to a driven shaft 14, which corresponds to the drive shaft 11 in the drive pulley 12, and a substantially V-shaped annular groove 16 is formed in the periphery of the pulley 15. An endless metallic belt 17 extends between the two pulleys 12 and 15 and engages with the annular grooves 13 and 16 to transmit rotation of the drive pulley 12 to the driven pulley 15.

Figure 2:
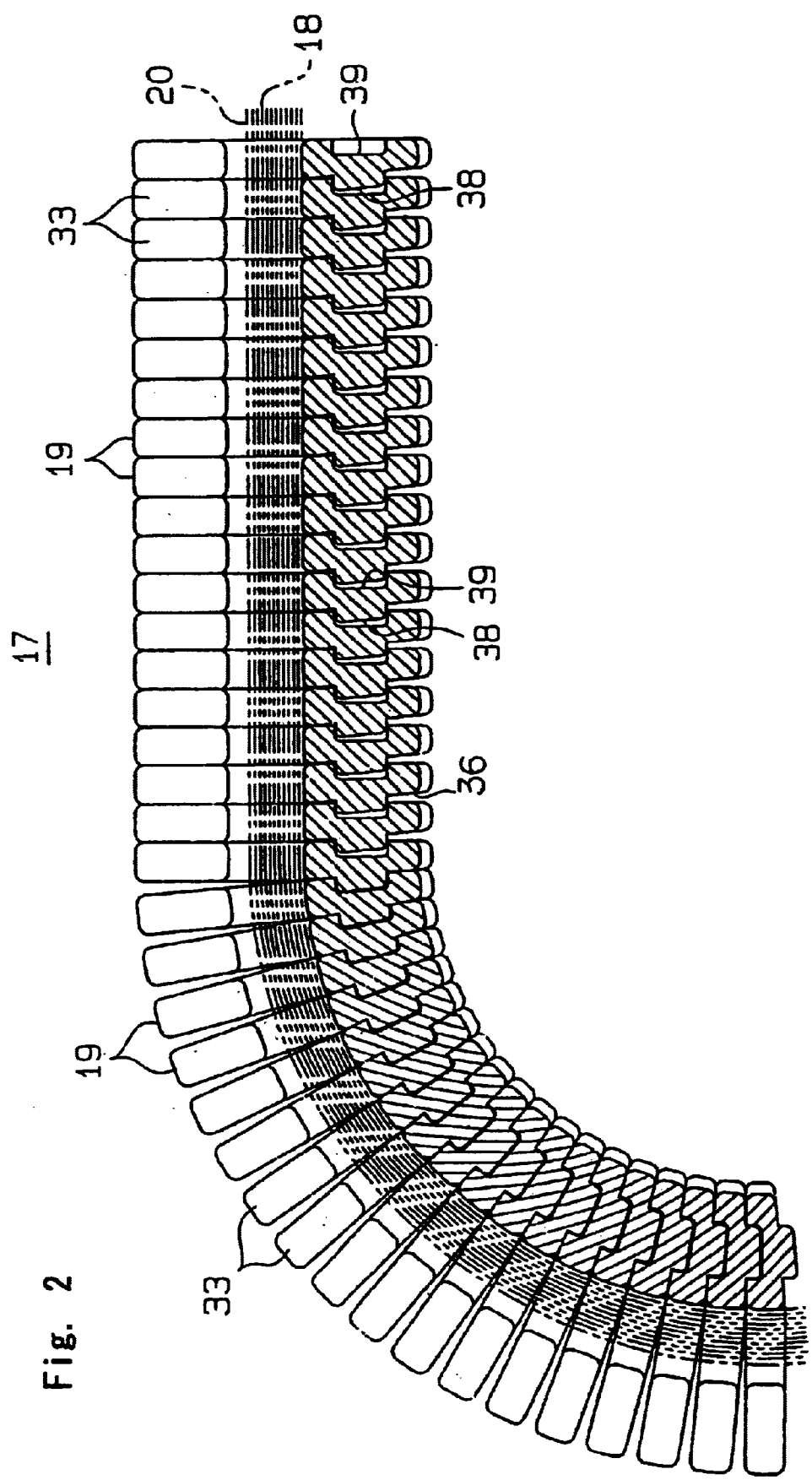
FIG. 2 is a partially sectional side view of the metallic belt.

As shown in FIGS. 2 and 3, the metallic belt 17 is made essentially of an endless metallic band 18, a multiplicity of metallic elements 19 and an endless belt-like metallic stopper 20, which is slightly wider than the band 18. The elements 19 are layered and are slidable relative to one another in the longitudinal direction to allow insertion of the band 18 through them. The band 18 is formed by laminating a plurality of metal sheets and is subjected to surface treatment on both sides or on one side by sand blasting or shot peening. This surface treatment permits a lubricant to be carried to reduce frictional resistance between the band 18 and each element 19.

Figure 4:
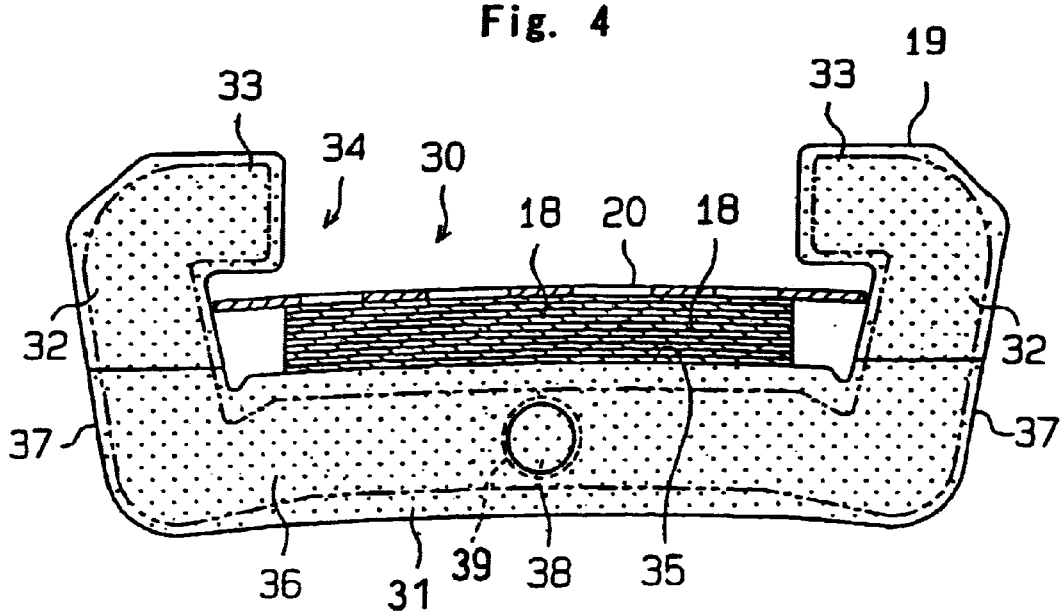
FIG. 4 is a front view of the element.

As shown in FIGS. 4 to 6, each element 19 is made by cutting a metallic wire 19a, which has a circular cross section and which is formed by drawing, into pieces of a predetermined length, bending the resulting pieces into the form of element 19, and pressing the resulting pieces. Each element 19 has a symmetrical form. The chain double-dashed lines in FIGS. 4 and 5(a) each show the shape of the element 19 before the pressing. Further, the entire outer surface of each element 19 is treated by sand blasting or shot peening like in the case of the band 18. The surface treatment carries a lubricant to reduce frictional resistance between the elements 19. Each element 19 has a hook-like pillar or rising portion 32 extending upward from each side of the upper face of a body 31. An opening or recess 30 is defined between the pillars 32 for receiving the band 18 and the stopper 20. The tips of the pillars 32 are bent inward to form engaging protrusions 33. An opening 34, which is slightly wider than the band 18 and slightly narrower than the stopper 20, is defined between the engaging protrusions 33. Each element 19 is supported at the recess 30 by the band 18.

The shoulder 35 of the body 31 on which the band 18 is placed has an arcuate shape, which projects gently upward to prevent winding of the band 18. When an excessive downward load is applied to the body 31, the shoulder 35 flexes to have a gentler curvature (to be almost linear), which reduces stress.

A first slope 36 is formed on one side of each element 19 of the body 31 by polishing. The first slope 36 is formed such that the thickness of the body 31 decreases gradually in the downward direction of FIGS. 4 and 5(b). The first slope 36 allows the row of elements 19 to curve along the periphery of the pulleys 12 and 15 when engaged with them. The body 31 has, on both ends, second slopes 37, which are inward slopes, in the view of FIG. 4. The second slopes 37 are formed by polishing. As shown in FIG. 3, the second slopes 37 are engaged with the inner side faces of the annular groove 13(16) of the pulley 12(15)

A boss 38 is formed by pressing at the center of the body 31, and a depression 39 is formed on the other side of the body 31 in alignment with the boss. Every two adjacent elements 19 engage with each other by the boss 38 and the depression 39, and thus the elements 19 are connected to one another in alignment.

As shown in FIG. 7, a plurality of slots 40 are defined in the stopper 20. Also, small holes 40a are defined adjacent to the slots 40. While the slots 40 are defined in the stopper 20 in pairs at equal intervals, they may be continuous and formed all around the stopper 20. Further, the stopper 20 may have, on both side or on one side surface, surface treatment formed by means of sand blasting or shot peening, which carries a lubricant to reduce frictional resistance among the stopper 20, the outermost layer of the band 18 and the elements 19.

Figure 8:
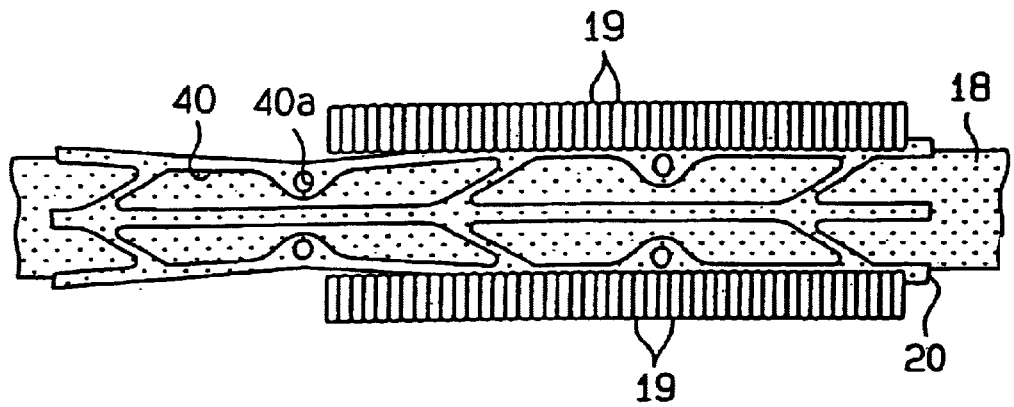
FIG. 8 is a plan view showing the state where the metallic elements are being incorporated into the band.
Figure 9:
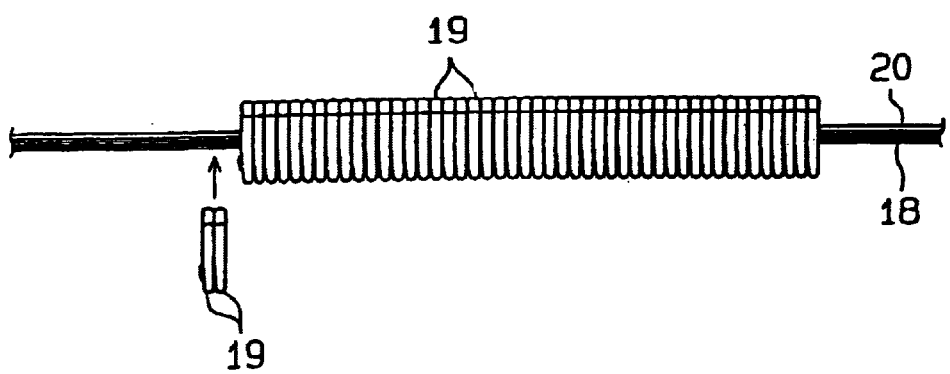
FIG. 9 is a side view showing the state where the metallic elements are being incorporated to the band.
Figure 10:
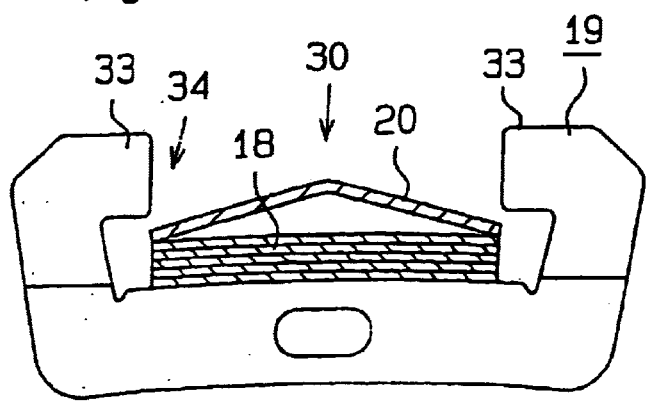
FIG. 10 is a vertical cross-sectional view showing the state where the metallic elements are being incorporated into the band.
Figure 11:
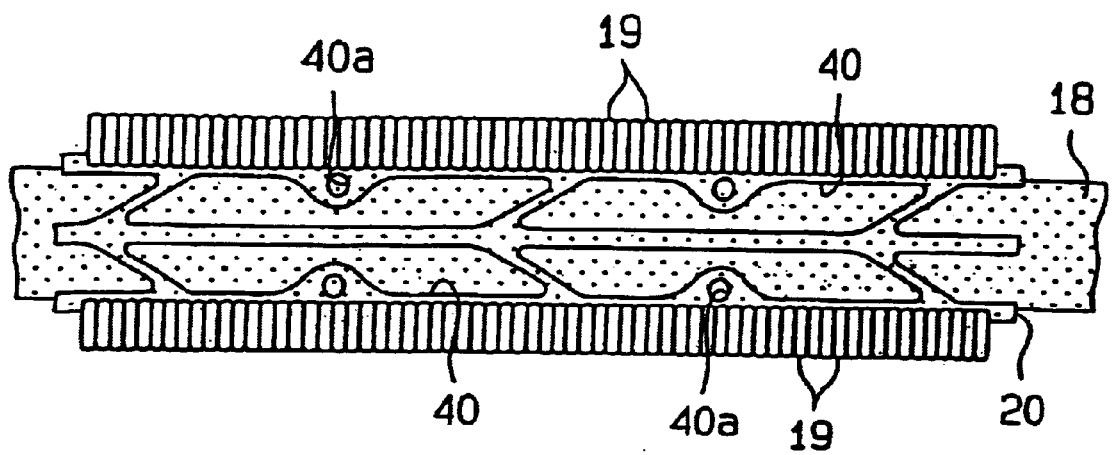
FIG. 11 is a plan view showing the state where the metallic elements have been incorporated fully into the band.
Figure 12:
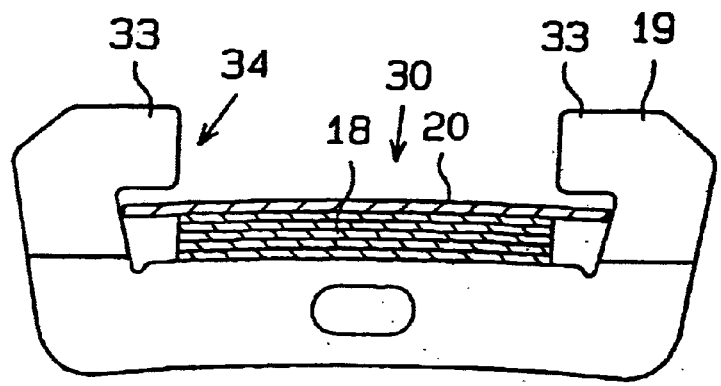
FIG. 12 is a vertical cross-sectional view showing the state where the metallic elements have been incorporated fully into the band.

The stopper 20 can be switched between a normal or a wide state, which is shown in FIGS. 11 and 12, and a curved or narrow state, which is shown in FIGS. 8 and 10. The stopper 20 is fitted on the periphery of the band 18, and the width of the stopper 20 in the wide state of FIG. 7 is then reduced to the narrow or flexed state shown in FIGS. 20 and 8 by engaging tools (not shown) with the small holes 40a to flex and reduce the width of the stopper 20. When the stopper 20 is in the curved state, it is designed to be slightly narrower than the width of the opening 34 of the element 19. As shown in FIG. 9, the elements 19 are fitted to the band 18 through the opening 34 of each element 19 so that they are supported by the band 18, and they are slid one after another toward a wider portion of the band 18. When the elements 19 are all fitted to the band 18, the tools are disengaged from the stopper 20. The stopper 20 then resumes the and flat state, and the ends of the element 19 engage the engaging protrusions 33 respectively, as shown in FIGS. 11 and 12. In this state, the elements 19 are prevented from slipping off the band 18.

Next, the effects of the above embodiment exhibits will be described.

In this embodiment, since each element 19 is provided with an opening 34 having a suitable width with respect to the width of the band 18, the weight of the elements 19 is reduced, and the weight of the entire metallic belt 17 is reduced. Actually, a 20 to 30% weight reduction was achieved in the metallic belt. Since this reduces the inertia force, the belt 17 is expected to show improved response to acceleration, deceleration and the like. Further, since each element 19 is made from a drawn wire, it is inexpensive. In addition, since each element 19 is obtained by subjecting wire, which has a circular cross section, to press molding, the elements 19a do not have corners like those obtained by punching a plate. Therefore, the elements 19 give no substantial damage to the band 18 and the stopper 20, which improves the durability of the metallic belt 17. Since each element 19 has a pillar 32 on each side, it is durable and resists from damage.

Figure 24:
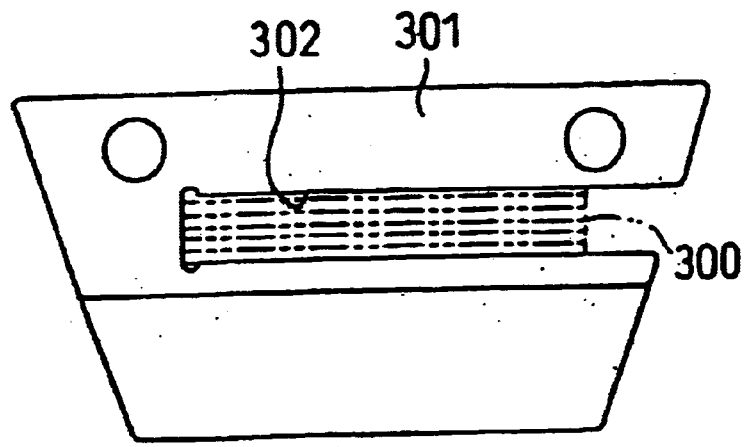
FIG. 24 is a front view of a prior art element.
Figure 25:
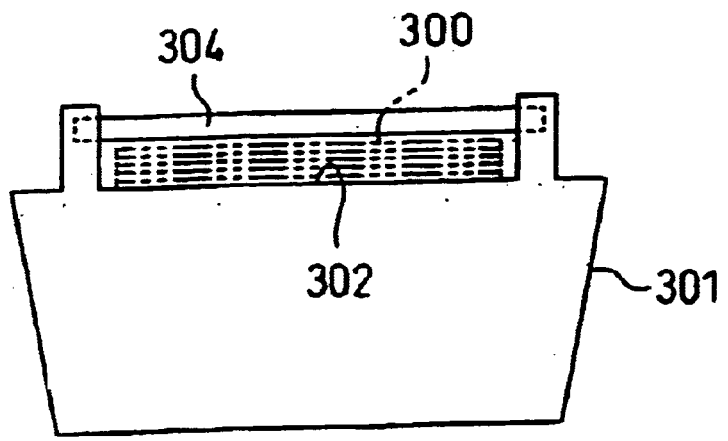
FIG. 25 is a front view of the prior art element.

In the state where elements are supported by the band, it is necessary to prevent the elements from slipping off the band, and measures have been proposed for this purpose. Japanese Unexamined Patent Publication No. Sho 55-100443 discloses a typical construction, as shown in FIG. 24. In FIG. 24, an element 301, which engages a band 300, includes a recess 302 that opens laterally. In the apparatus shown in FIG. 24, the element 301 includes a pair of recesses 302 that open laterally. Japanese Unexamined Patent Publication No. Sho 62-35136 discloses an apparatus as shown in FIG. 25, in which, after a band 300 is placed in a recess 302 of an element 301, a cross piece 304 is placed across the opening of the recess 302.

However, in the apparatus shown in FIG. 24, the element 301 may slip off the belt 300 through the lateral opening. In the constitution shown in FIG. 25, the cross pieces 304 must be fixed to a multiplicity of elements 301 by means of welding or the like, after the elements 301 are incorporated into the band 300. This is a difficult task, since the elements 301 are small. Besides, a cross piece 304 must be prepared for each element 301. This increases the number of parts and makes the apparatus complicated.

In the first embodiment of the invention, the engaging protrusions 33 of the element 19 engage with the stopper 20 to securely prevent the element 19 from slipping off. Incorporation of a single stopper 20 does not make the apparatus complicated compared with the prior art, for example, as shown in FIG. 25, in which each element is provided with a cross piece 304 for presenting the elements from slipping off from the band.

Since the elements 19 are supported by the band 18 by using the flexibility of the stopper 20, they can be incorporated into the belt very easily.

The slots 40 and small holes 40a defined in the stopper 20 for flexing contribute to reducing the weight of the metallic belt.

Second Embodiment

A second embodiment of the present invention will be described specifically referring to FIGS. 13 to 17. In the second embodiment, the expressions "upper" and "lower", and "right" "left" are based on the drawing shown in FIG. 15. The expressions "ahead" and "behind" are also based on FIG. 15.

Figure 13:
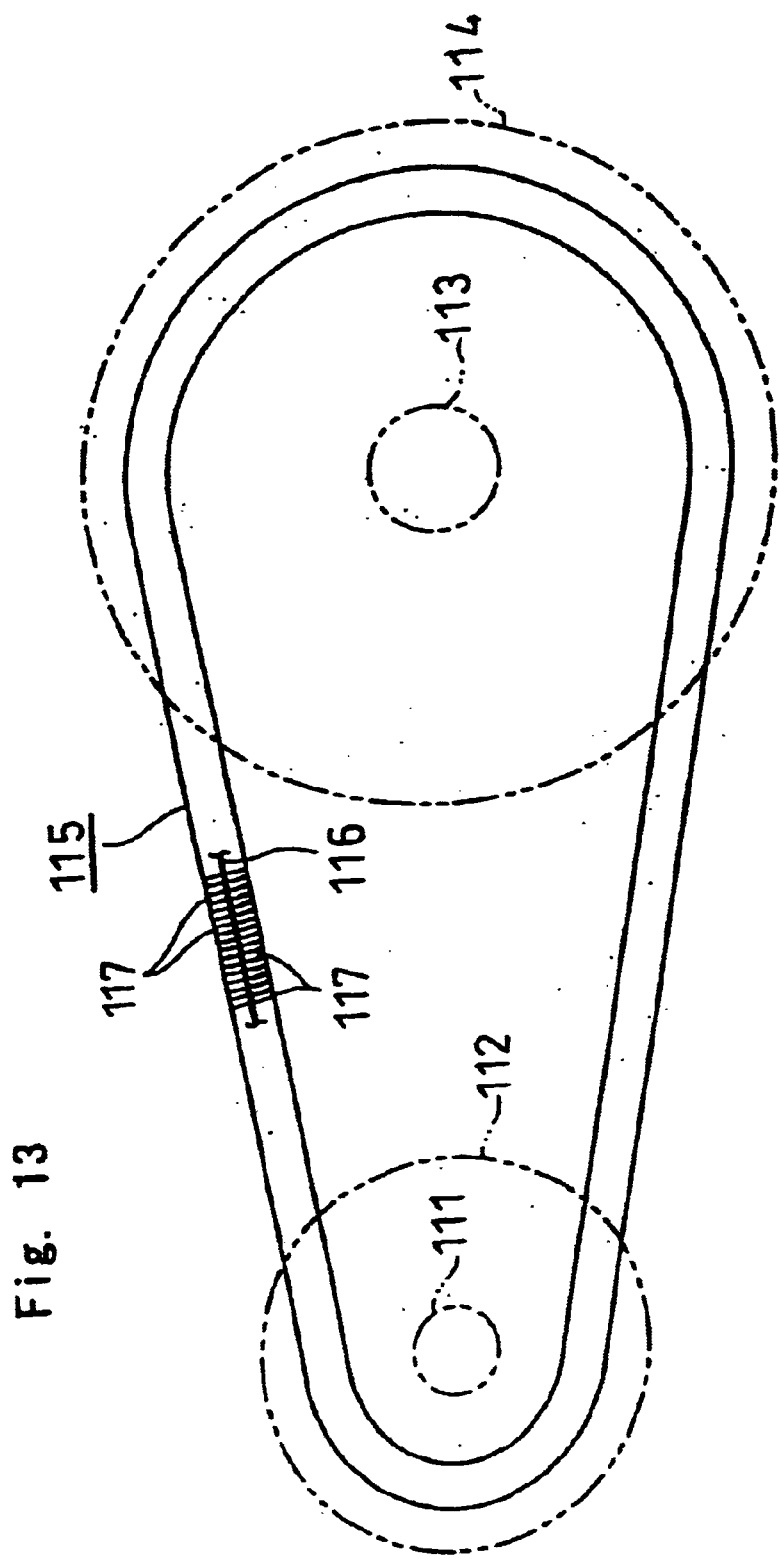
FIG. 13 is a side view showing the variable speed device according to a second embodiment of the present invention.
Figure 15:
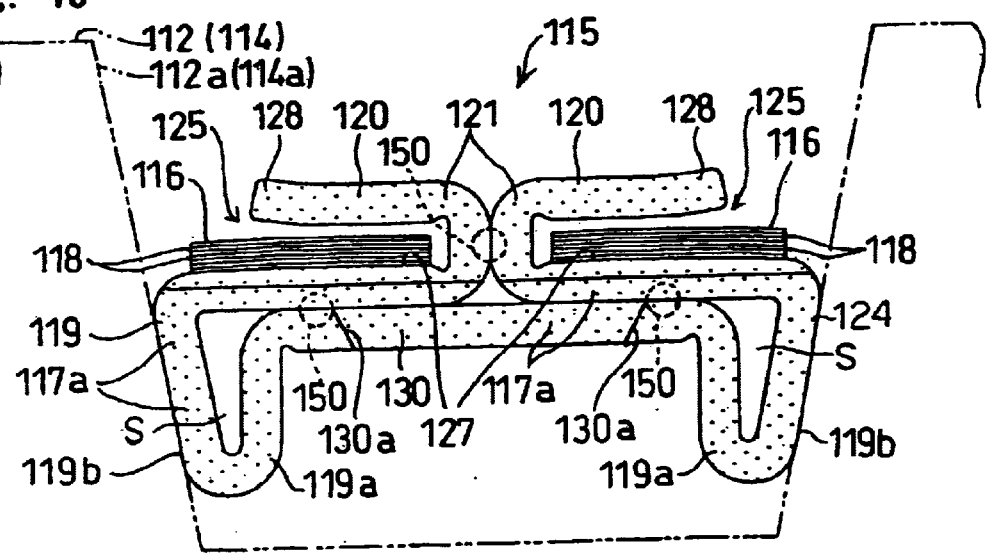
FIG. 15 is a front view showing an element of the metallic belt shown in FIG. 14.
Figure 16:
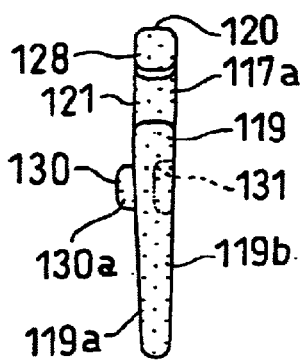
FIG. 16 is a side view showing the element of the metallic belt shown in FIG. 14.

As shown in FIGS. 13 and 15, a drive pulley 112 is attached to a drive shaft 111. A substantially V-shaped annular groove 112a is formed on the periphery of the pulley 112. A driven pulley 114 is attached to a driven shaft 113, which corresponds to the drive shaft 111, of the drive pulley 112, and a substantially V-shaped annular groove 114a is formed on the periphery of the pulley 114. An endless metallic belt 115 extends between the drive pulley 112 and the driven pulley 114 to engage with the annular grooves 112a and 114a to transmit rotation of the drive shaft 111 through the drive pulley 112, the metallic belt 115 and the driven pulley 114 to the driven shaft 113.

Figure 14:
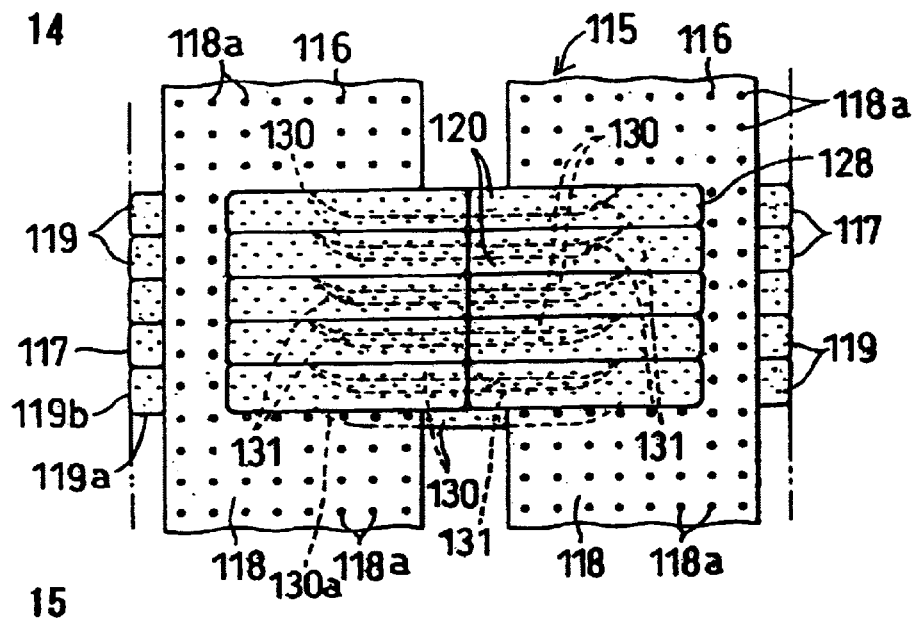
FIG. 14 is a partial plan view of the metallic belt according to the second

As shown in FIGS. 14 and 15, the metallic belt 115 includes essentially a pair of endless metallic bands 116 and a multiplicity of metallic elements 117. The elements 117 are layered between the bands 116 to be slidable relative to one another in the longitudinal direction of the bands 116.

Each band 116 is formed by laminating a plurality of endless belt-like bodies 118, each made of a metal sheet, and each endless belt-like body 118 has surface treatment 118a on both sides or on one side. The surface treatment 118a is formed, for example, by a treatment or embossed pattern formed on the periphery of a roller, which is used when the endless belt-like body 118 is fed through a plurality of rollers. Otherwise, the surface treatment is formed by subjecting the endless belt-like body 118, which is rolled into a predetermined thickness, by sand blasting or shot peening to produce very small dimples, each having a substantially arcuate cross section. Formation of the surface treatment 118a reduces the contact surface area among the endless belt-like bodies 118 in each band 116 and between the band 116 and each element 117. The surface treatment also permits a lubricant to be carried in the dimples. Thus, frictional resistance among the endless belt-like bodies 118 and between the bands 16 and each element 117 is reduced.

As shown in FIGS. 14 to 17, each element 117 is obtained by bending a metallic wire 124, which has a substantially rectangular cross section and a predetermined length, to form an entire element 117. Each element 117 has a symmetrical form. The elements 117 are obtained by cutting a metallic wire 124 into a predetermined lengths and bending the resulting pieces. Abutting portions, which are indicated by the chain double-dashed lines circles 150 in FIG. 15, are welded, Thus, empty spaces S are defined in the wire 124.

The wire 124 is made of a ferrous metal such as a high carbon steel wire rod. Each element 117 has a surface treatment 117a over its entire outer surface formed by sand blasting or shot peening. The surface treatment permits a lubricant to be carried to reduce frictional resistance between the elements 117 and between the bands 116 and each element 117.

Each element 117 has a body 119 and heads 120 formed integrally therewith through center pillars 121. The heads 120 extend from the body 119 through the pillars 121. A pair of slits 125, in which the bands 116 are inserted, is defined on one side of each pillar 121. The bands 116 run through the slits 125, and the heads 120 prevents the elements 117 from slipping off of the bands.

The shoulders 127 of the body 119 are located below the slits 125, on which the bands 116 are placed. Each shoulder 127 has an arcuate shape and projects gently to prevent winding of the bands 116. The tips 128 of the heads 120, which are above the slits 125, are arcuately curved upward, so that the tips 128 do not interfere with the surfaces of the bands 116.

A pair of first slopes 119a are formed on one side of the body 119 on each element 117. The first slopes 119a are formed such that the thickness of the body 119 decreases gradually in the downward direction in FIG. 16. The body 119 in each element 117 also has, on both ends, second downward slopes 119b. The second slopes 119b are engaged with the inner side faces of the annular grooves 112a(114a) of the pulley 112(114). When the drive pulley 112 is rotated, the metallic belt 115 is circulated to transmit rotation to the driven pulley 114. When the width of the annular groove or grooves 112a/114a in one of or both of the pulleys 112 and 114 is changed due to a change in the torque of the drive side or the driven side, the elements 117 shift in the radial directions of the pulleys 112 and 114, accordingly.

A protrusion or boss 130 is formed at the center of the body 119. The boss 130 has, on each side, tapered faces 130a, which are widest at the upper end of the body 119 and which taper downward to be more narrow toward the lower end of the body 119. Each boss 130 has on the rear side a depression 131 conforming to the shape of the boss 130. Thus, the width of the boss 130 and that of the depression 131 change continuously along the inner wall surfaces of the annular grooves 112a and 114a of the pulleys 112 and 114 to increase from the bottom of each groove toward the opening. Every two adjacent elements 117 are engaged with each other by the 130 and the depression 131 to prevent the elements 117 from becoming misaligned.

Figure 17:
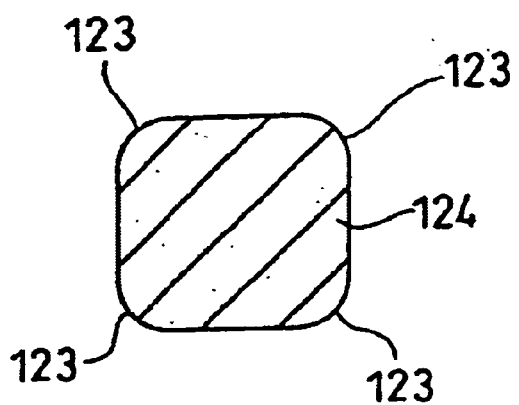
FIG. 17 is a cross-sectional view of the wire.

As shown in FIG. 17, the wire 124 is arcuately chamfered at each of the four corners 123. Thus, the element 117 has no corners on the periphery that can damage the surfaces of the bands 116 and the inner surfaces of the annular grooves 112a and 114a of the pulleys 112 and 114.

The element 117 is obtained by cutting the wire 124, which has a cross-sectional profile as shown in FIG. 17, into a predetermined length, followed by bending. The ends of the wire 124 abut against one another at the pillars 121. The abutments may be mere abutment or may be fixed by welding. The wire 124 is obtained by extrusion or cold rolling. Thus, arcuate chamfers are formed at the corners 123 simultaneously when the material 124 is extruded, and the thus molded wire 124 has a mirror surface.

Next, the effects of the second embodiment will be described below.

In this embodiment, each element 117 is formed by wire 124, so that the corners 123 of the wire 124 can be chamfered easily when the material 124 is extruded, as described above. The arcuately chamfered corners 123 prevent damage to the bands 116 and pulleys 112 and 114, which improves the durability of the metallic belt 115.

Only the outer structure of each element 117 is formed by the wire 124, and empty spaces S are defined therein. This reduces the weight of each element 117 and of the metallic belt 115. Therefore, the centrifugal force of the metallic belt around the peripheries of the pulleys 112 and 114 and the inertia force in response to acceleration and deceleration is reduced, which results in excellent response and smooth performance in power transmission.

Since each element 117 is formed by the wire 124, each element 117 flexes slightly inward when an excessive load or force acts upon it. For example, when an inward pressure is applied to the second slopes 119b of each element 117 by the pulleys 112 and 114, the elements 117 flex slightly inward accordingly. This releases the load or force and prevents damage to or abnormal abrasion of the pulleys 112 and 114 and the elements 117, which improves the durability of the metallic band 115.

Since the wire 124 has substantially rectangular cross section, the elements 117 can be layered neatly in face to face contact with one another along the longitudinal direction of the bands 116, which prevents vibration and noise and improves power transmission efficiency.

The entire periphery of each element 117 is composed not of faces formed by cutting but of faces formed by cold rolling. Therefore, even if each element 117 is subjected to sand blasting or other treatment, the flat surfaces are merely roughened without marring the surface flatness. This ensures surface contact between the elements 117 and contributes to efficient power transmission.

Since the shoulders 127 each have an arcuate shape, they prevent winding of the bands 116, preventing damage of the bands 116 and elements 117.

Since the tips of the heads 120 are arcuately curved upward, damage to the tips 128 of the heads 120 and to the bands 116 is prevented.

Third Embodiment

Figure 18:
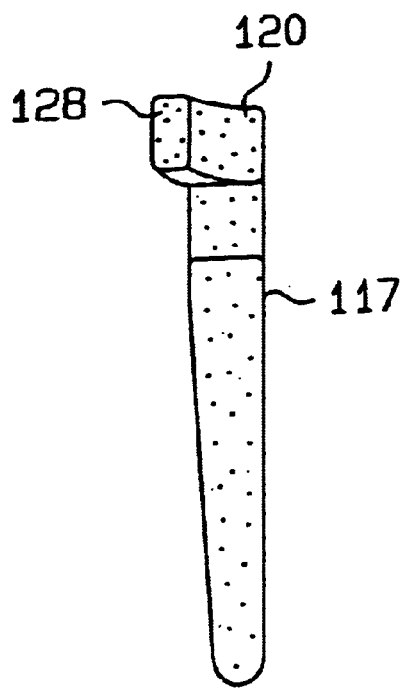
FIG. 18 is a side view of the element according to a third embodiment.
Figure 19:
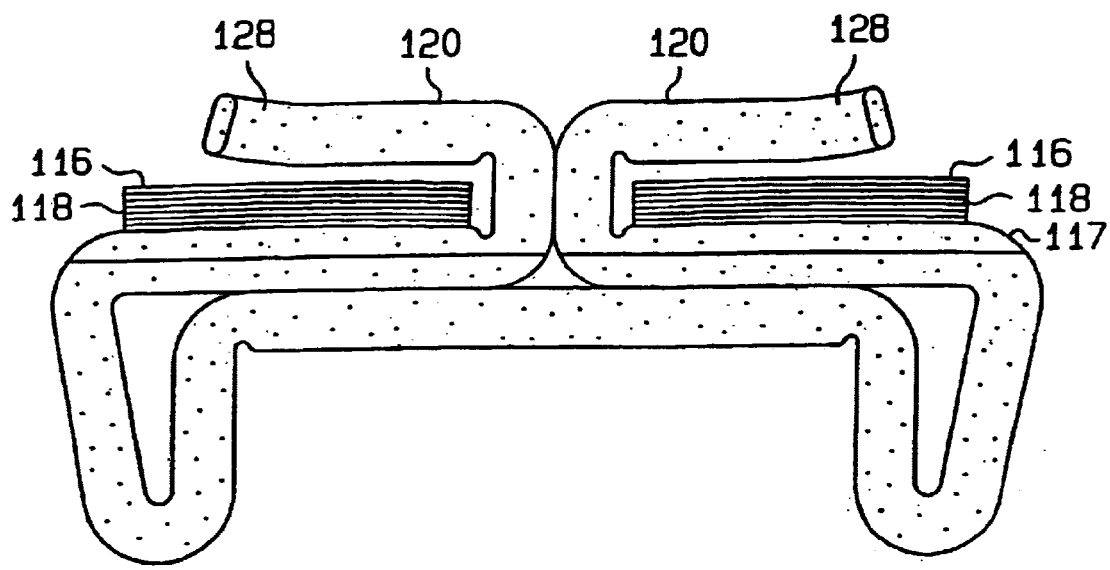
FIG. 19 is a front view of the element according to the third embodiment.

A third embodiment will be described referring to FIGS. 18 to 20. The third embodiment is a modification of the second embodiment. The tips 128 of the heads 120 in the third embodiment are curved forward. Therefore, in the third embodiment, the elements 117 can be maintained in alignment by engagement between the tips 128 of every adjacent two elements 117.

Fourth Embodiment

Figure 21:
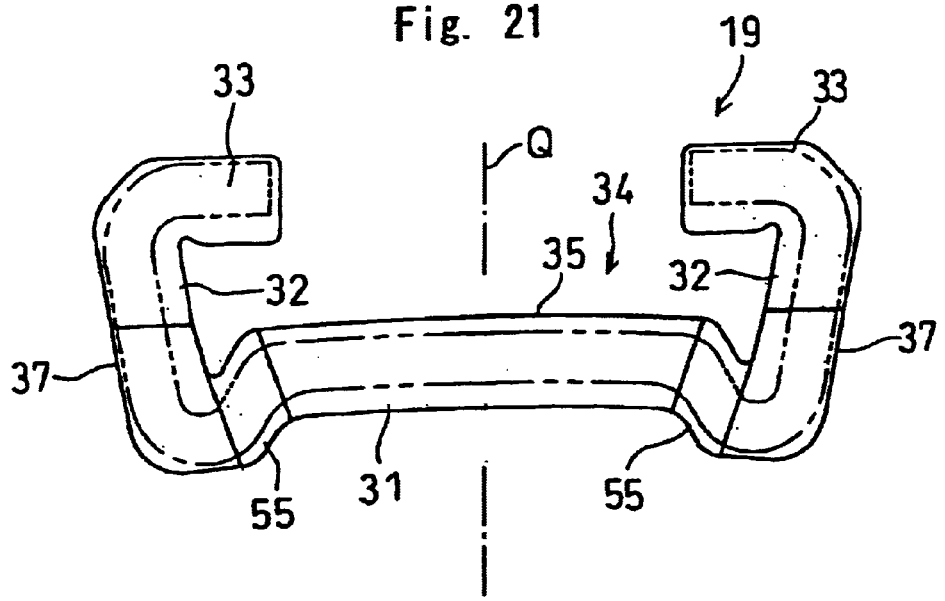
FIG. 21 is a front view of the element according to a fourth embodiment.
Figure 22:
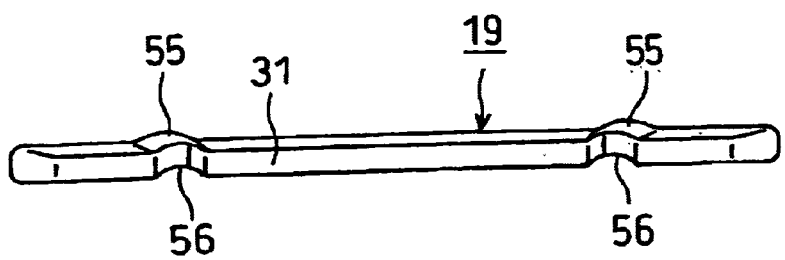
FIG. 22 is a plan view of the element shown in FIG. 21.
Figure 23:
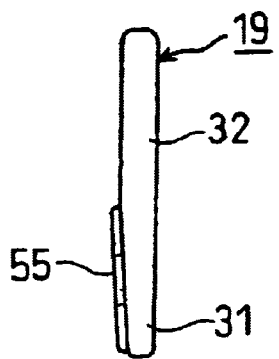
FIG. 23 is a side view of the element shown in FIG. 21.

A fourth embodiment will be described referring to FIGS. 21 to 23. The fourth embodiment is a modification of the first embodiment. A pair of protrusions 55 are formed on each side pressing in the fourth embodiment. The protrusions 55 are formed on each side of the body 31 diagonally and symmetrically with respect to a plane Q including the circulating face of the element 19. Each protrusion 55 has a fixed width and a depression 56 formed on the rear side in alignment with the protrusion 55.

If an excessive load is applied downward to the body 31, the shoulder 35 flexes to have a gentler curvature (to be almost linear), which reduces stress.

Other Embodiments

For example, the shape of the element 19 in the first embodiment can be modified variously. For example, through holes may be formed in the body 31 reduce the weight.

While slots 40 and the like are formed in the stopper 20 of the first embodiment, the shape of the slots 40 is not limited to that illustrated in FIG. 7, but various shapes may be used including a simple square and a rhombus.

In the first embodiment, the shape and the size of the boss 38 formed on the body 31 are not limited as long as every adjacent two elements 19 connect to each other without slipping off and the metallic belt 17 can maintain its function. For example, the boss 38 may have a square cross section. The shape of the depression 39 conforms to the shape of the boss 38.

In the first embodiment, the boss 38 and the depression 39 are formed on the body 31. However, they may be formed on other portions, as long as every adjacent two elements 19 are connected to each other without slipping off and the metallic belt 17 can maintain its function. They may be formed on the pillars 32. The connection between every adjacent two elements 19 may not depend on the engagement between the boss 38 and the depression 39, and the lower end of the body 31 or tips of the engaging protrusions 33 may be curved depending on the direction of connecting the elements 19 to achieve engagement among the thus curved portions.

In the first embodiment, the stopper 20 was bent when the elements 19 were engaged with the band 18. However, it is also possible to orient the element 19 diagonally with respect to the stopper 20 to bring one side edge of the stopper 20 into the recess 30. Then, the element 19 is turned around that side end to place the band 18 in the recess 30.

In each element 117, abutting portions of the wire 124 may be welded at position different from those illustrated in each embodiment.

Figure 20:
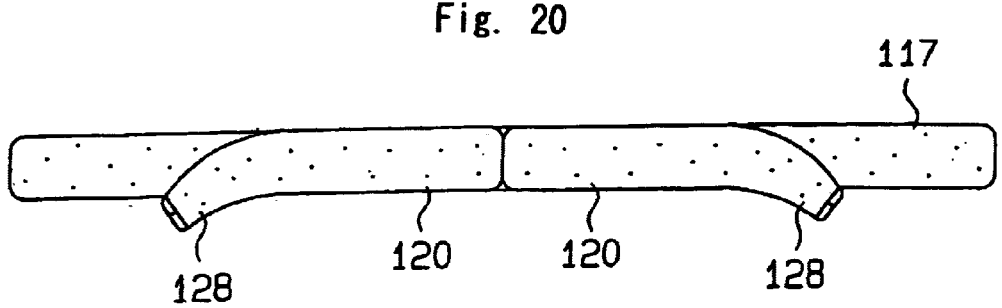
FIG. 20 is a plan view of the element shown in FIG. 19.

In the third embodiment, the tips 128 of the heads 120 may be curved in the opposite direction or backward in the view of FIG. 20.

The corners 123 of the wire 124 may be chamfered not arcuately but linearly.

The empty spaces S defined in the elements formed by the wire 31 and 124 respectively may be packed with a synthetic resin material for absorption of vibrations, noises, etc.

Two or more kinds of metallic materials are provided for elements 19 and 117, and these material are arranged or layered to be adjacent to different materials respectively. This constitution can reduce vibrations, and noises due to the difference in the natural frequency between the adjacent elements 19(117).

Different materials from that employed in the above embodiments maybe used for the elements 19 and 117. There may be used, for example, ferrous metals other than hard steel and stainless steel.

The elements 19 and 117 may be subjected to surface hardening treatment at the shoulders 35 and 127 of the body 31 and 119 and at the second slopes 37 and 119b in the elements 19 and 117.

A super hard metal power is sprayed over the shoulders 35 and 127 of the body 31 and 119 and over the second slopes 37 and 119b of the elements 19 and 117, and the powder is melted by heating and solidified to form a super hard alloy layer.

In the present invention, the element is formed using a wire. This can prevent damage of the bands and the like. Further, the weight of the element can be reduced compared with the case where the element is formed using a plate material. In addition, if an excessive load or force is acted upon the element, it can flex slightly accordingly to release the load or force, preventing damage and abnormal abrasion of pulleys and elements.

What is claimed is:

1. A metallic belt element, a plurality of which are used to form a belt which includes an endless metal band for supporting the elements, wherein the element comprises:
   a continuous piece of wire that is bent into a predetermined shape, wherein the wire has a round cross-section or a generally rectangular cross-section with rounded corners, and wherein the shape includes a recess for receiving the metal band;
   wherein the element includes a body for engaging a pulley and pillars that extend from the body, wherein an arm extends from each pillar in a generally lateral direction;
   wherein the element includes a projection, which is located on a first side of the body, and a depression, which is located on a second side of the body, wherein the first side is opposite to the second side, and the projection conforms to the shape of the depression;
   wherein the first side of the body is formed such that the thickness of the body decreases gradually in the downward direction.

2. A metallic belt element, a plurality of which are used to form a belt which includes an endless metal band for supporting the elements, wherein the element comprises:
   a continuous piece of wire that is bent into a predetermined shape and is then pressed, wherein the wire has a round cross-section or a generally rectangular cross-section with rounded corners, and wherein the shape includes a recess for receiving the metal band and a stopper to prevent the element from slipping off the band;
   wherein the element includes a body for engaging a pulley and a pair of pillars that extend from the body to rise gradually outward, wherein an arm extends from each pillar in a generally lateral direction;
   wherein the element includes a projection, which is located on a first side of the body, and a depression, which is located on a second side of the body, wherein the first side is opposite to the second side, and the projection conforms to the shape of the depression; and
   wherein the first side of the body is formed such that the thickness of the body decreases gradually in the outward direction.

3. The metallic belt element according to claim 2 wherein the projection is circular in cross-section.

4. The metallic belt element according to claim 2 wherein the stopper is of a thin plate and contains through holes, which are designed to reduce rigidity of the stopper and to impart flexibility thereto.

5. The metallic belt element according to claim 2, wherein the element has a plane of symmetry, and the projection extends in an oblique direction to the plane of symmetry.

6. An endless metallic belt comprising
   an endless metal band for supporting a plurality of elements;
   a plurality of elements disposed on said endless metal band; and
   a stopper disposed on said endless metal band to prevent the elements from slipping off the band,
   wherein each said element comprises:
      a continuous piece of wire that is bent into a predetermined shape and is then pressed, wherein the wire has a round cross section or a generally rectangular cross-section section with rounded corners, and wherein the shape includes a recess for receiving the metal band and the stopper, the element including a body for engaging a pulley and a pair of pillars that extend from the body to rise gradually outward, wherein an arm extends from each said pillar in a generally lateral direction, the element further including a projection, which is located on a first side of the body, and a depression, which is located on a second side of the body, wherein the first side is opposite to the second side, and the projection conforms to the shape of the depression, the first side of the body being formed such that the thickness of the body decreases gradually in the outward direction.

7. A metallic belt element, a plurality of which are used to form a belt which includes an endless metal band for supporting the elements, wherein the element comprises:
   a continuous piece of wire that is bent into a predetermined shape, wherein the wire has a round cross-section or a generally rectangular cross-section with rounded corners, and wherein the shape includes a recess for receiving the metal band, wherein the recess is a first recess for receiving a first belt, and the element includes a second recess for receiving a second belt;
   wherein the element includes a body for engaging a pulley and a pillar that extends from the body, wherein a pair of arms extend from the pillar in a generally lateral direction;
   wherein the element includes a projection, which is located on a first side of the body, and a depression, which is located on a second side of the body, wherein the first side is opposite to the second side, and the projection conforms to the shape of the depression; and
   wherein the first side of the body is formed such that the thickness of the body decreases gradually in the outward direction.

8. The metallic belt element according to claim 7, wherein the first recess is a mirror image of the second recess.

9. The metallic belt element according to claim 8, wherein the first recess and the second recess are defined between the pair of the arms and the body.

10. The metallic belt element according to claim 7, wherein the element has a plane of symmetry, and the projection has tapered faces that extend in an oblique direction to the plane of symmetry.

11. An endless metallic belt comprising
   a plurality of metallic belt elements; and
   an endless metal band for supporting the elements, the metal band including a first belt and a second belt,
   wherein each said element comprises:
      a continuous piece of wire that is bent into a predetermined shape, wherein the wire has a round cross section or a generally rectangular cross-section with rounded corners, and wherein the shape includes a recess for receiving the metal band, wherein the recess is a first recess for receiving the first belt, and the element includes a second recess for receiving the second belt;

wherein the element includes a body for engaging a pulley and a pillar that extends from the body, wherein a pair of arms extend from the pillar in a generally lateral direction;

wherein the element includes a projection, which is located on a first side of the body, and a depression, which is located on a second side of the body, wherein the first side is opposite to the second side, and the projection conforms to the shape of the depression;

wherein the first side of the body is formed such that the thickness of the body decreases gradually in the outward direction.

* * * * *